(No Model.)
W. S. MOORE.
VACUUM PUMP.
No. 501,954. Patented July 25, 1893.
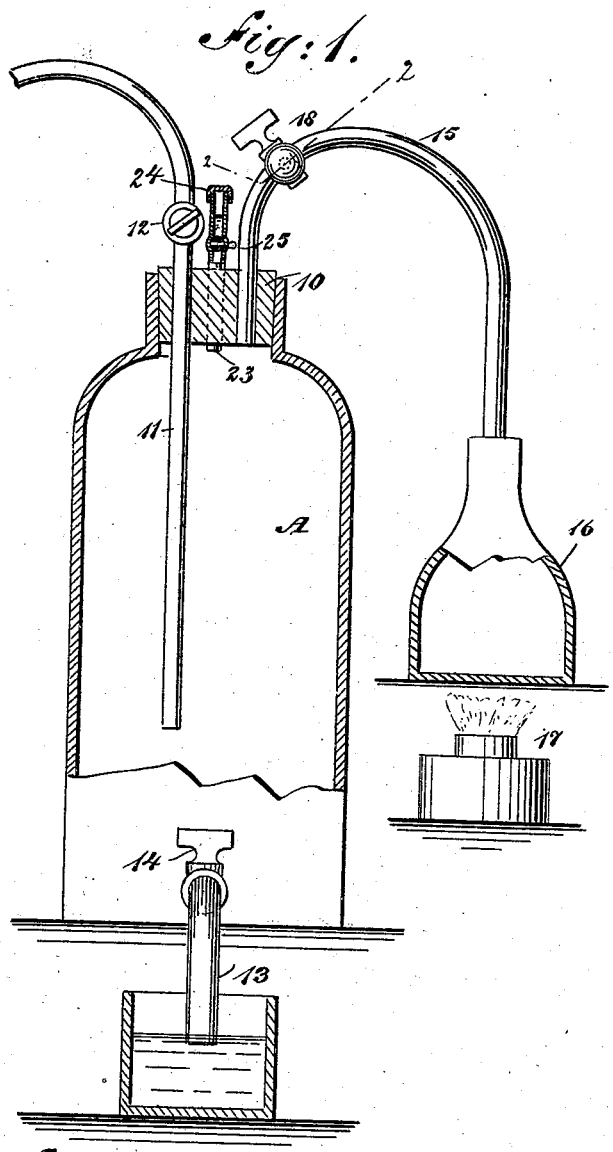
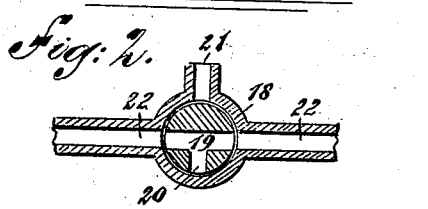
WITNESSES:
Chas. Nida.
C. Sedgwick
INVENTOR
W. S. Moore
BY Munn & Co.
ATTORNEYS.

UNITED STATES PATENT OFFICE.

WILLIAM S. MOORE, OF NEW YORK, N. Y.

VACUUM-PUMP.

SPECIFICATION forming part of Letters Patent No. 501,954, dated July 25, 1893.

Application filed September 12, 1892. Serial No. 445,640. (No model.)

*To all whom it may concern:*

Be it known that I, WILLIAM S. MOORE, of New York city, in the county and State of New York, have invented a new and useful Improvement in Vacuum-Pumps, of which the following is a full, clear, and exact description.

My invention relates to an improvement in vacuum pumps, and has for its object to provide a pump of that description of exceedingly simple, durable and economic construction and capable of being expeditiously and conveniently operated whenever its use is required.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in both the views.

Figure 1 is a partial central vertical section and partial side elevation of the vacuum pump in its simple form. Fig. 2 is a section taken through a three-way valve used in connection with the pump, the section being indicated by the line 2—2 of Fig. 1.

A is a vessel of any suitable material and of any desired size, the said vessel being that in which the vacuum is to be established. The top of the vessel is hermetically sealed by means of a stopper 10, or any equivalent thereof, and through this stopper one end of a liquid inlet tube 11, is introduced, which tube extends well down within the vessel A; and the tube also extends upward through and beyond the stopper 10, and is provided above the stopper with a valve or stop cock 12. The tube 11 is that employed to convey into the vacuum chamber the liquid that the pump is adapted to withdraw and receive.

At or near the bottom of the vessel A an offtake pipe 13, is located, the said pipe being provided with a suitable stop cock 14; and a gas supply pipe 15, is introduced at one end into and through the stopper 10, the other end of the pipe 15, being introduced into a retort 16, or a vessel of any description in which a gas may be generated, and beneath the vessel 16 a heating agent 17 of any approved character is located.

The gas inlet tube 15, is provided with a three-way cock 18, shown in detail in Fig. 2. The three-way cock is provided with the ordinary through channel 19 in its key, and a branch channel 20, and the casing is provided with the ordinary exit and through openings designated respectively as 21 and 22. The construction of the simple form of the device is completed by placing in the stopper 10 an auxiliary tube 23, adapted to contain water in small quantities. This tube, to that end, is provided at its top with a cap 24, and below the cap with a stop cock 25, or its equivalent, the space between the cap and the stop cock being adapted for the storage of water.

In the operation of this form of the vacuum pump water or ammonia, or any equivalent absorbent liquid, preferably, however ammonia, is placed in the retort 16. The stop cock 14, connected with the lower pipe 13, is opened, and the three-way cock 18 is also manipulated to bring its through channel longitudinally of the pipe with which it is connected. Thus between the retort and the interior of the vessel in which the vacuum is to be formed a direct communication is formed, while an exit is made at the bottom of the vessel. The stop cock or valve 12 in the fluid inlet pipe is closed, as is likewise the stop cock 25 in the auxiliary pipe 23. A heating vessel is placed beneath the retort, and as ammonia gas is generated it passes down into the vessel A and forces the air out from the vessel, and when all of the air has been expunged from the vessel A, the stop cocks 14 and 18 are turned off, thus admitting no more gas into the vessel, as at that time substantially a positive vacuum has been produced, the gas taking the place of the air. When the three-way cock is turned off with respect to the vessel A, any gas that may be subsequently generated will pass out through the branch channels 20 and 21 of the valve key and its casing. The stop cock 25 in the auxiliary pipe 23, is then opened sufficiently to permit a drop or so of water stored in that pipe to enter the vessel A; this water will absorb the ammonia gas and a perfect vacuum will be obtained. It is evident from the above description that the creation of this vacuum is exceedingly expeditious and convenient. The vessel may now be filled with any fluid desirable by simply placing the upper end of the fluid inlet pipe 11 in communication with the liquid to be drawn into the vessel and opening the stop cock 12.

Having thus described my invention, I claim as new and desire to secure by Letters Patent—

1. The combination with the vessel A provided with an outlet faucet at its lower end, of a stopper for the mouth of the vessel a valved water inlet pipe and a valved gas inlet pipe 15 communicating with the vessel through its stopper, and a retort 16 connected with pipe 15 and beneath which a heating device is adapted to be placed; the vessel A and parts connected therewith being portable as a whole, substantially as set forth.

2. A portable apparatus of the character described comprising the vessel A having a faucet in its lower end, a stopper for its mouth, a pipe 23 entering through the stopper and having a cap 24 and a valve 25, the water inlet pipe provided with a valve, and the retort 16 having a pipe 15 leading through the stopper and provided with a valve, substantially as set forth.

WILLIAM S. MOORE.

Witnesses:
J. FRED. ACKER,
E. M. CLARK.